United States Patent
Chen et al.

(10) Patent No.: US 7,342,891 B2
(45) Date of Patent: Mar. 11, 2008

(54) PORT INFORMATION DISPLAY SYSTEM AND METHOD FOR DISPLAYING PORT PERFORMANCE OF NETWORK DEVICES

(75) Inventors: Yi Chien Chen, Tu-Chen (TW); Jain-Chung Wang, Tu-chen (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 913 days.

(21) Appl. No.: 10/648,119

(22) Filed: Aug. 25, 2003

(65) Prior Publication Data

US 2004/0133667 A1    Jul. 8, 2004

(30) Foreign Application Priority Data

Dec. 20, 2002   (TW) ............................... 91136963 A

(51) Int. Cl.
*G01R 31/08* (2006.01)
*G06F 15/177* (2006.01)
*G06F 11/30* (2006.01)

(52) U.S. Cl. .................. 370/241; 370/252; 370/278; 709/221; 702/182

(58) Field of Classification Search ............... 370/241, 370/244, 245, 389, 276, 293, 296, 274, 275, 370/277, 255; 702/184, 183, 182, 188; 709/221
See application file for complete search history.

(56) References Cited

U.S. PATENT DOCUMENTS

| 5,648,966 | A | | 7/1997 | Kondo et al. | |
|---|---|---|---|---|---|
| 5,862,404 | A | * | 1/1999 | Onaga | ........................... 710/8 |
| 6,006,045 | A | * | 12/1999 | Miyawaki | ...................... 399/8 |
| 6,138,121 | A | | 10/2000 | Costa et al. | |
| 6,975,963 | B2 | * | 12/2005 | Hamilton et al. | ........... 702/182 |
| 7,168,049 | B2 | * | 1/2007 | Day | ........................... 715/835 |

* cited by examiner

Primary Examiner—Hanh Nguyen
(74) Attorney, Agent, or Firm—Wei Te Chung

(57) ABSTRACT

A system and method for displaying port performance of networking devices (6) is provided. The system is implemented in a networking infrastructure which includes an administrative workstation (2) and at least one networking devices. The administrative workstation can obtain and display information on ports of the networking device in real time. A plurality of port information pages (28) formed according to a simulating figure (280) of the networking device are provided by the administrative workstation. The simulating figure is for simulating a front panel of a respective network device and comprises a plurality of port icons (282). The port icon is for displaying traffic volume statuses for corresponding ports respectively with different colors and image configurations. A current event bar (286) is provided for displaying the most up-date event information of the networking device.

15 Claims, 5 Drawing Sheets

PORT INFORMATION DISPLAY SYSTEM AND METHOD FOR DISPLAYING PORT PERFORMANCE OF NETWORK DEVICES

BACKGROUND OF THE INVENTION

1. Field of the Invention

The present invention relates to computer network administration systems and methods, and particularly to a port information display system and method for instantly displaying port performance of network devices.

2. Background of the Invention

With the rapid development of networking technology in the late 1980s and in the 1990s, more and more sub-networks are being used in organizations. It is becoming increasingly important to monitor network activities in such organizations. With increasing amounts of networking and mainframes in a network, it is becoming more difficult for professionals to effectively administer the network. Comprehensive standards and effective methods are needed for proper administration of the network.

In general, a network management application displays a graphical image of a front panel of a network device on a display monitor. The image may include items such as management of a layer2/layer3 switch, router or hub. Clicking on a display icon that represents a port selects rudimentary information on that port or an action to be performed for that port. Generally, no further information on the port is obtained by clicking on the icon.

It is necessary or at least useful to monitor a port's speed, duplex status, and traffic volume status. To do so by conventional means, a port information page must be separately opened. In addition, conventional means do not provide automatic notification when a port changes to a lower speed or carries unduly heavy traffic. Timely notice is needed so that any system problems can be attended to as soon as possible.

SUMMARY OF THE INVENTION

Accordingly, an object of the present invention is to provide a port information display system and method for instant visualizing port performance of network devices in a more intuitional manner (for example, different colors or images), wherein the port information comprises port performance and event information.

To achieve the above-mentioned object, a port information display system in accordance with a preferred embodiment of the present invention comprises: a plurality of network devices each comprising a plurality of ports, each port being linked to a terminal device; an administrative workstation for obtaining information on ports of the network devices, displaying port performance and event information; and a connection connecting the administrative workstation and the network devices. The administrative workstation comprises: a network monitoring module for obtaining information on the ports of the network devices; a database for storing information on the ports of the network devices, and for storing display definitions which define display modes of simulated light emitting diodes (LEDs) representing ports, said definitions comprising colors corresponding to different traffic volume statuses and image configurations that respectively represent two duplex statuses; a plurality of port information pages, each port information page corresponding to a respective one of the network devices and comprising a simulative figure for simulating a front panel of a respective network device, and for displaying port performance of the respective network device using different colors and images in real time; and a port information display module for displaying port performance of the network devices based on obtained information on display definitions, and for displaying event information in the current event bar in real time.

Further, the present invention provides a port information display method implemented in a networking infrastructure which comprises an administrative workstation and a plurality of network devices. The method comprises the steps of: (a) obtaining information on port performance of the network devices; (b) obtaining corresponding information on display definitions based on the information port performance; (c) displaying port performance using different colors and images configurations; (d) displaying a port speed in a corresponding port icon for each of the ports; and (e) displaying event information in a designated space in real time.

Other objects, advantages and novel features of the present invention will be drawn from the following detailed description of the present invention with the attached drawings, in which:

DETAILED DESCRIPTION OF THE INVENTION

Figure 1:
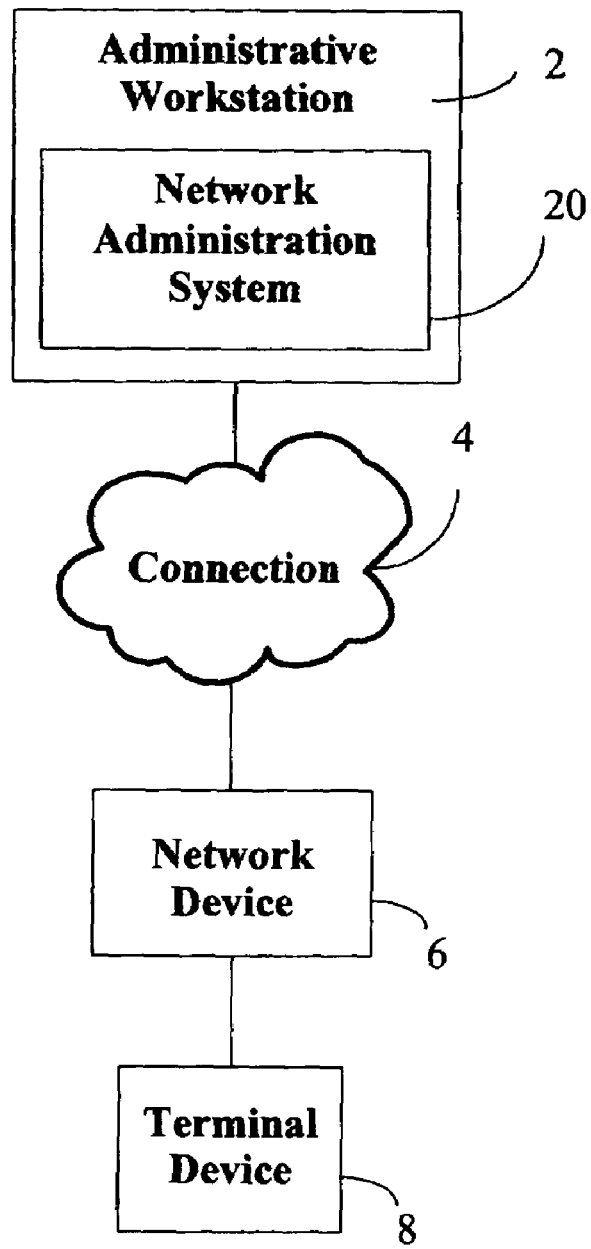
FIG. 1 is a simplified, schematic diagram of infrastructure of a port information display system in accordance with the preferred embodiment of the present invention, the port information display system comprising an administrative workstation, a network administration system and a network device.

FIG. 1 is a simplified, schematic diagram of infrastructure of a port information display system in accordance with the preferred embodiment of the present invention. The port information display system comprises: a plurality of network devices 6 (only one shown) comprising a plurality of ports (not shown), each port being linked to a terminal device 8 (only one shown); an administrative workstation 2 for obtaining and displaying information on the ports of the network devices 6; and a connection 4 connecting the administrative workstation 2 and the network devices 6. The administrative workstation 2 comprises a mainframe or a server, and a network administration system 20. Each network device 6 may be a switch, a router or a hub. Port information comprises port performance and event information. Port performance comprises a name of the relevant network device 6, a port number, a transmission speed, a traffic volume status, and a duplex status. The traffic volume status may be low, medium, or high. The duplex status may be full duplex or half duplex. Event information comprises pre-defined changes in port performance and alterations in topology of the connection 4. Each terminal device 8 may be a server, a computer workstation, a printer or a fax coupled to a network, or a UPS (Uninterrupted Power Supply). The connection 4 may the Internet or an intranet, or may have a ring topology, a bus topology, a tree topology or a hybrid topology.

Figure 2A:
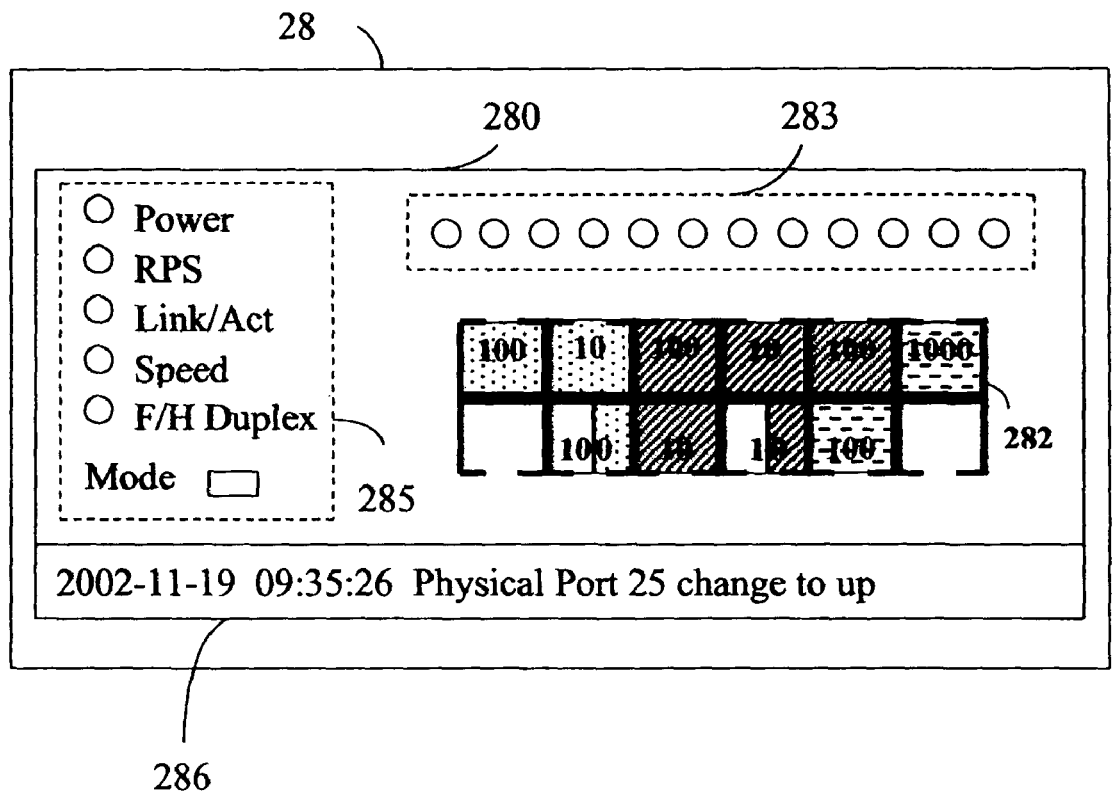
FIG. 2A schematically illustrates part of an exemplary port information page that can be displayed by the administrative workstation of FIG. 1.
Figure 2B:
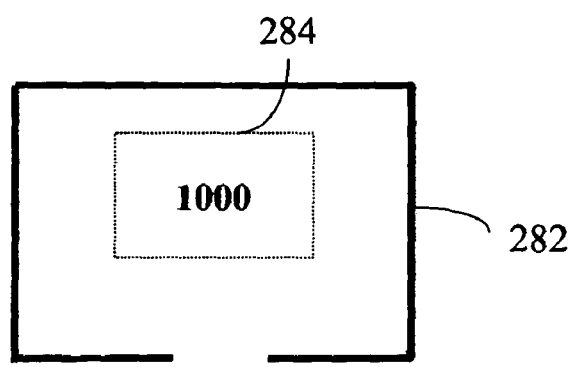
FIG. 2B is an enlarged view of one port icon shown in FIG. 2A.

FIG. 2A schematically illustrates part of an exemplary port information page 28 that can be displayed by the administrative workstation 2. The administrative workstation 2 can simultaneously provide a plurality of port information pages 28, each of which corresponds to a respective one of the network devices 6. Each port information page 28 is used for conveniently displaying information on ports of the respective network device 6. The port information page 28 comprises: a simulative FIG. 280, and a current event bar 286 below the simulative FIG. 280. The simulative FIG. 280 is for simulating a front panel of the relevant network device 6, and for visualizing port performance of the network device 6. The simulative FIG. 280 comprises a plurality of port icons 282, a plurality of simulated LEDs (light emitting diodes) 283 representing ports, and a basic information column 285. Each port icon 282 can display a traffic volume status and a duplex status for the corresponding port, respectively with different colors and image configurations. The colors and images configurations can be pre-defined by administrators of the port information display system. In the preferred embodiment, three traffic volume statuses are defined (low, medium, and high), each having a unique color. Full duplex status is represented by an undivided port icon 282, and half duplex status is represented by the port icon 282 being vertically divided down its middle. FIG. 2B is an enlarged view of one of the port icons 282 of FIG. 2A. A port speed display 284 displays a port speed in the port icon 282. Other information on port performance can be obtained by clicking on the relevant port icon 282. Each port LED 283 corresponds to one port of the network device 6, and displays a working status, a transmission speed or a duplex status for the corresponding port. The working status may be link down, link up, port active or port blocked.

The basic information column 285 displays some basic information on the relevant network device 6, and also displays mode settings for the port LEDs 283. In the preferred embodiment, the basic information comprises two simulated system LEDs called "Power" and "RPS" (redundant power supply). Three simulated mode LEDs are provided for indicating any of three display modes of the port LEDs 283, and a mode icon is provided for selecting any one of the three mode LEDs. The three display modes of the port LEDs 283 are called "Link/Act," "Speed," and "F/H Duplex" (full or half duplex), and respectively correspond to a working status, a transmission speed and a duplex status. The administrator can click on the mode icon to select any one of the three display modes for the port LEDs 283.

The current event bar 286 displays event information on the network device 6 in real time. Event information comprises a date, a time and basic information on an event.

Figure 2C:
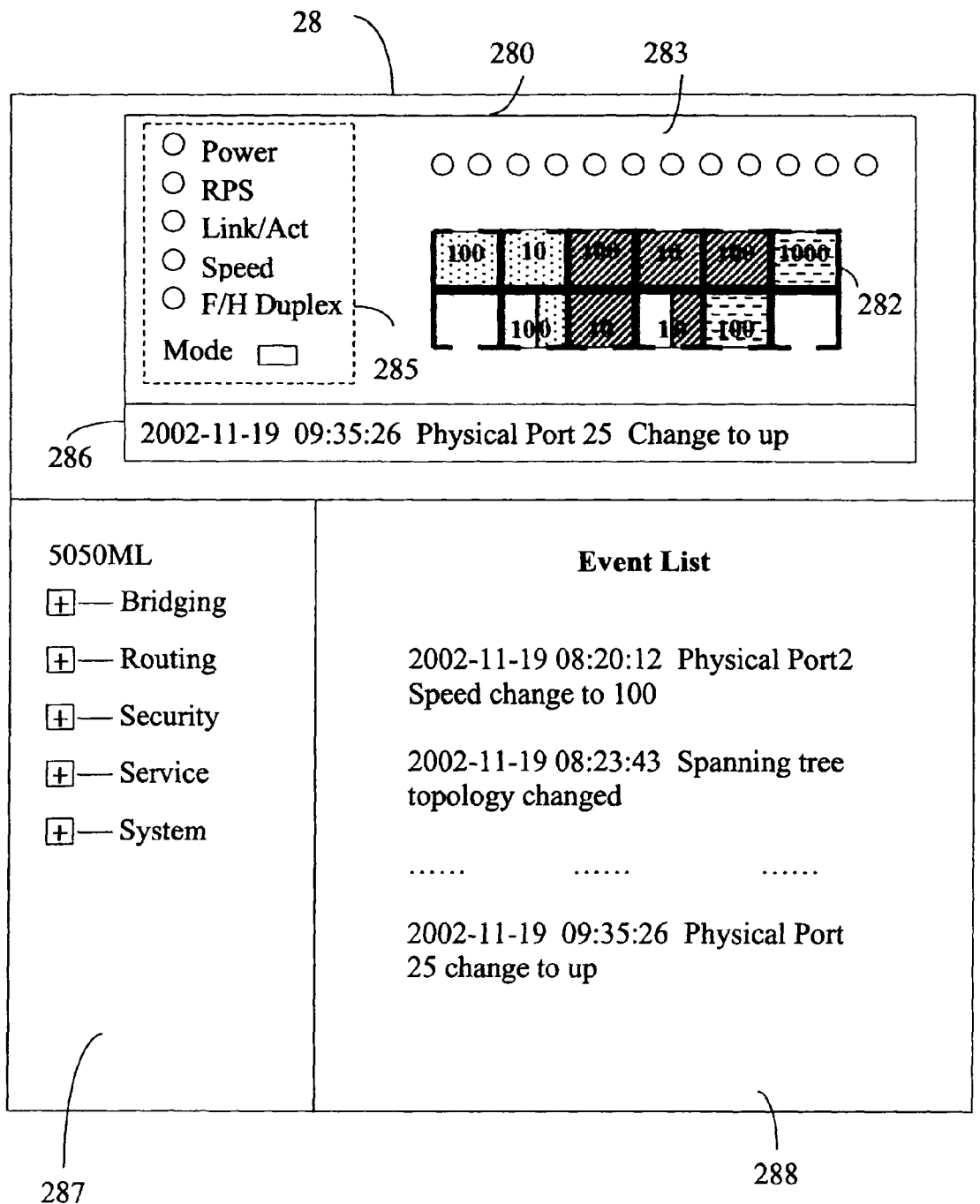
FIG. 2C schematically illustrates an entirety of the exemplary port information page of FIG. 2A.

FIG. 2C schematically illustrates an entirety of the exemplary port information page 28 of FIG. 2A. The port information page 28 further comprises an operation selection column 287 and an information column 288 both below the current event bar 286. Through the operation selection column 287, the administrator can configure basic data on bridging, routing, security, service and other system settings for the network device 6. The information column 288 is used for displaying said basic data, port performance details obtained by clicking on a corresponding port icon, and event information. In FIG. 2C, an Event List of recent events is shown.

Figure 3:
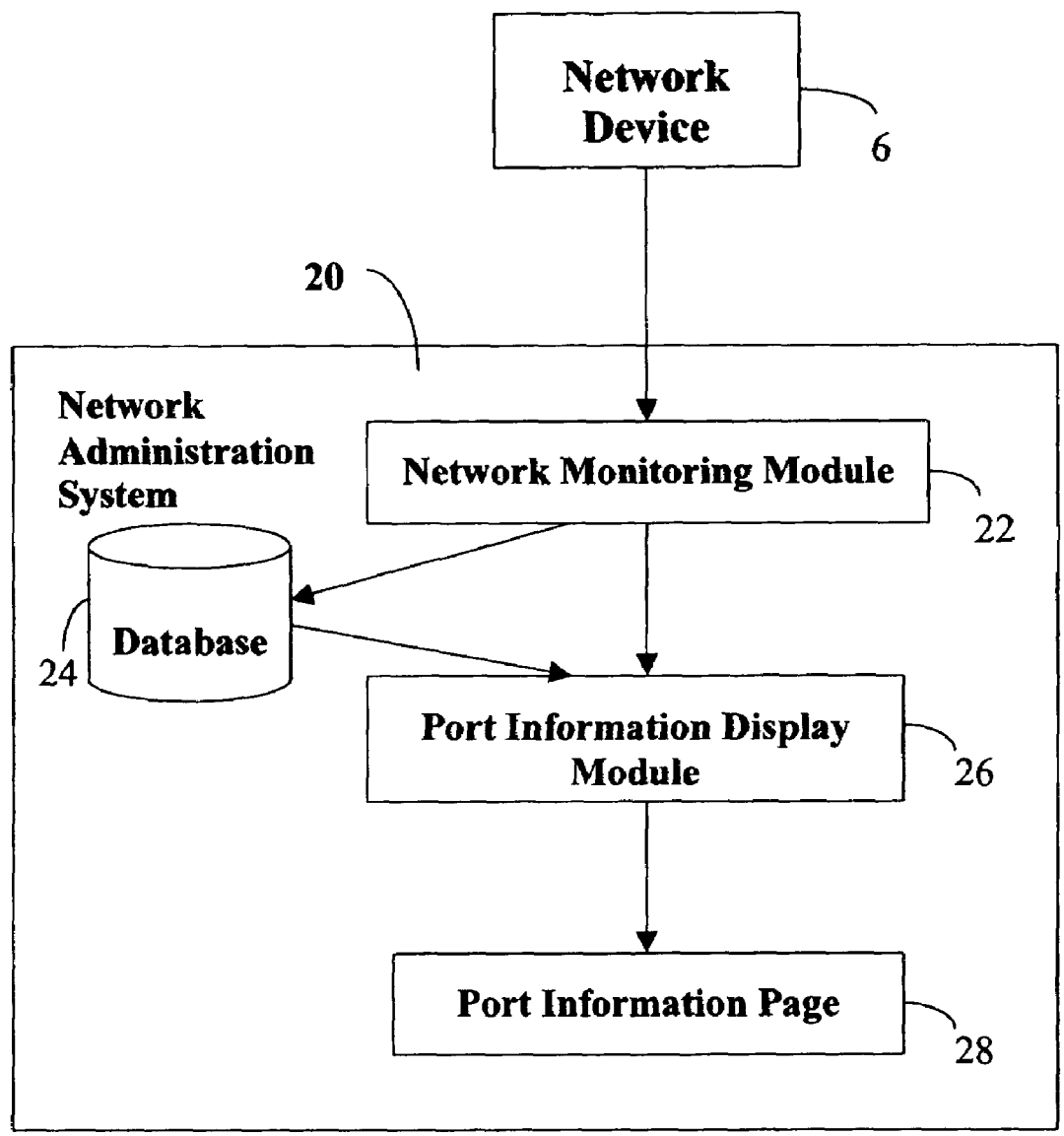
FIG. 3 is a schematic diagram of infrastructure of the network administration system of FIG. 1, and showing connection of the network administration system with the network device.

FIG. 3 is a schematic diagram of infrastructure of the network administration system 20 of FIG. 1, and showing connection of the network administration system 20 with the network device 6. The network administration system 20 comprises a network monitoring module 22, a database 24, a port information display module 26, and a plurality of port information pages 28 (only one shown). The network monitoring module 22 is for obtaining information on ports of the network devices 6, and comprises suitable monitoring software. Said information on ports may be obtained by periodically accessing the network devices 6. Alternatively, said information on ports may be sent by any network device 6 when an event occurs at a port of the network device 6, or when the topology of the connection 4 (see FIG. 1) is changed. The database 24 is for storing information on all ports of the network devices 6, and for storing display definitions. The display definitions define display modes of the port LEDS 283, colors corresponding to different traffic volume statuses, and image configurations that respectively represent the two duplex statuses. The port information display module 26 is for obtaining information on display definitions for ports by accessing the database 24, and for visualizing port performance in corresponding port icons 282 of the port information page 280. The port information display module 26 also determines whether information on ports of the network devices 6 comprises one or more events, and displays event information in the current event bar 286 in real time.

Figure 4:
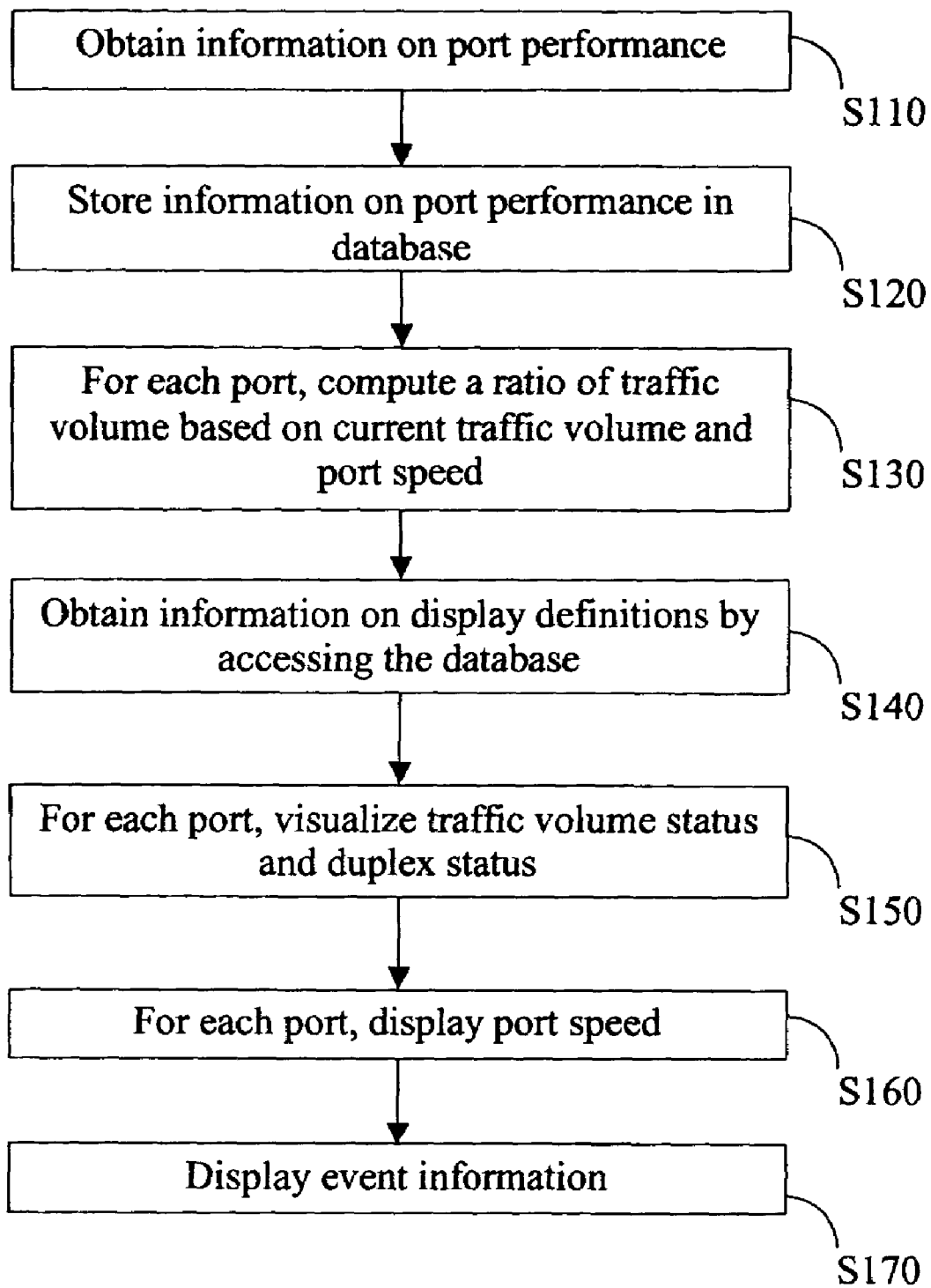
FIG. 4 is a flowchart of a preferred method for implementing the port information display system of the present invention.

FIG. 4 is a flowchart of a preferred method for implementing the port information display system of the present invention. In step S110, the network monitoring module 22 obtains information on port performance for each port of each of the network devices 6. In step S120, the network monitoring module 22 stores the information on port performance in the database 24. In step S130, for each port, the port information display module 26 computes a ratio of traffic volume based on a current traffic volume and a port speed. The equation for computing is: ratio of traffic volume=current traffic volume/port speed. In step S140, the port information display module 26 obtains information on display definitions for ratios of traffic volume and duplex statuses, by accessing the database 24. In step S150, for each port, the port information display module 26 displays a traffic volume status and a duplex status with a corresponding color and a corresponding image configuration in the corresponding port icon 282, based on the information on display definitions. In step S160, for each port, the port speed is displayed in the port speed display 284 of the corresponding port icon 282. In step S170, the port information display module 26 displays event information in the current event bar 286 in real time.

In general, the port information display system and method of the present invention may take forms other than what is described above. While preferred embodiments for carrying out the invention have been described in detail, those familiar with the art to which the invention relates will recognize various alternative designs and embodiments for practicing the invention. These alternative embodiments are within the scope of the present invention. The scope of the present invention is defined by the claims appended hereto and allowable equivalents thereof.

What is claimed is:

1. A port information display system implemented in a networking infrastructure comprising an administrative workstation and a plurality of network devices, the administrative workstation comprising:
- a network monitoring module for obtaining information on ports of the network devices; and
- a plurality of port information pages each comprising a simulative figure for simulating a front panel of a respective network device, and for displaying information on ports of the network device, the simulative figure comprising a plurality of port icons for displaying traffic volume statuses and duplex statuses for corresponding ports respectively with different colors and image configurations.

2. The system according to claim 1, wherein each of the network devices comprises a switch, a router or a hub.

3. The system according to claim 1, wherein the information on ports comprises port performance and event information, and the port performance comprises a working status, a transmission speed and a duplex status.

4. The system according to claim 1, wherein the administrative workstation further comprises a database for storing information on ports of the network devices, and for storing display definitions, said display definitions comprising colors corresponding to different traffic volume statuses and image configurations that respectively represent two duplex statuses.

5. The system according to claim 1, wherein the administrative workstation further comprises a port information display module for displaying port performance in corresponding port icons of the port information pages based on obtained information on display definitions, and for displaying event information on the port information pages in real time, wherein the information on display definitions comprises colors corresponding to different traffic volume statuses and image configurations that respectively represent two duplex statuses.

6. The system according to claim 1, wherein each of the port icons has a port speed display for displaying a port speed.

7. A port information page implemented in a networking infrastructure comprising a plurality of network devices and an administrative workstation for displaying port performance of the network devices, wherein the port information page comprises a simulative figure for simulating a front panel of a respective network device, and for displaying information on ports of the network device, the simulative figure comprising a plurality of port icons for displaying traffic volume statuses for corresponding ports with different colors.

8. The port information page according to claim 7, wherein each of the port icons has a port speed display for displaying a port speed.

9. The port information page according to claim 7, wherein each of the port icons is for further displaying duplex statuses for corresponding ports with different image configurations.

10. The port information page according to claim 7, further comprising a current event bar for displaying event information on the network device in real time.

11. A port information display method implemented in a networking infrastructure which comprises an administrative workstation and a plurality of network devices, the method comprising the steps of:
- (a) obtaining information on port performance of the network devices;
- (b) obtaining corresponding information on display definitions based on the information on port performance, the information on display definitions comprising colors corresponding to different traffic volume statuses and image configurations that respectively represent two duplex statuses; and
- (c) displaying port performance using different colors and images configurations.

12. The method according to claim 11, wherein step (c) further comprises the step of:
for each of the ports, displaying a port speed.

13. The method according to claim 11, further comprising the step of:
- (d) displaying event information in a designated space in real time.

14. The method according to claim 11, further comprising the step of:
predefining the display definitions, and generating corresponding information on the display definitions.

15. The method according to claim 11, wherein said port performance includes a volume status and a duplex status.

* * * * *